US006948032B2

(12) United States Patent
Kadambi et al.

(10) Patent No.: US 6,948,032 B2
(45) Date of Patent: Sep. 20, 2005

(54) METHOD AND APPARATUS FOR REDUCING THE EFFECTS OF HOT SPOTS IN CACHE MEMORIES

(75) Inventors: Sudarshan Kadambi, Hayward, CA (US); Vijay Balakrishnan, Mountain View, CA (US); Wayne I. Yamamoto, Saratoga, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 410 days.

(21) Appl. No.: 10/354,327

(22) Filed: Jan. 29, 2003

(65) Prior Publication Data

US 2004/0148465 A1 Jul. 29, 2004

(51) Int. Cl.$^7$ ............................................. G06F 12/00
(52) U.S. Cl. ..................... 711/120; 711/133; 711/141
(58) Field of Search ............................ 711/120, 133, 711/141

(56) References Cited

U.S. PATENT DOCUMENTS

| | | | | |
|---|---|---|---|---|
| 5,900,012 A | * | 5/1999 | Tran | 711/120 |
| 6,154,812 A | * | 11/2000 | Hetherington et al. | 711/122 |
| 6,848,031 B2 | * | 1/2005 | Jourdan | 711/137 |
| 6,874,056 B2 | * | 3/2005 | Dwyer et al. | 711/3 |

* cited by examiner

Primary Examiner—Jack A. Lane
(74) Attorney, Agent, or Firm—Park, Vaughan & Fleming LLP

(57) ABSTRACT

One embodiment of the present invention provides a system that uses a hot spot cache to alleviate the performance problems caused by hot spots in cache memories, wherein the hot spot cache stores lines that are evicted from hot spots in the cache. Upon receiving a memory operation at the cache, the system performs a lookup for the memory operation in both the cache and the hot spot cache in parallel. If the memory operation is a read operation that causes a miss in the cache and a hit in the hot spot cache, the system reads a data line for the read operation from the hot spot cache, writes the data line to the cache, performs the read operation on the data line in the cache, and then evicts the data line from the hot spot cache.

20 Claims, 3 Drawing Sheets

METHOD AND APPARATUS FOR REDUCING THE EFFECTS OF HOT SPOTS IN CACHE MEMORIES

RELATED APPLICATION

The subject matter of this application is related to the subject matter in a co-pending non-provisional application by the same inventors as the instant application and filed on the same day as the instant application entitled, "Method and Apparatus for Predicting Hot Spots in Cache Memories," having Ser. No. 10/354,329, and filing date Jan. 29, 2003.

BACKGROUND

1. Field of the Invention

The present invention relates to the design of cache memories within computer systems. More specifically, the present invention relates to a method and an apparatus for alleviating performance problems caused by hot spots in cache memories.

2. Related Art

Microprocessors use cache memories to store frequently used data closer to the computing engines. This helps to speed up applications because it takes considerably less time to access data in cache than it does to access data in main memory. Caches, however, are not without their limitations. Caches cannot be made infinitely large due to chip area and timing considerations. Typically, caches use a hashing scheme based on a target address of the data to allocate space in the cache memory for the data. Since caches are much smaller than main memory, multiple addresses in main memory will map to the same address in cache memory. The hashing scheme controls how many lines of main memory map to the same location in cache.

"Hot spots" in cache memories result from multiple blocks of data competing for the same location in cache. When a second piece of data gets allocated to the same location in cache as a first piece of data, the first piece of data is evicted from cache. If the first piece of data is subsequently requested by the application, the application typically has to wait for the first piece of data to be retrieved again from a lower level of the memory hierarchy, thus resulting in a much longer wait than if the first piece of data was still in cache.

Typically, microprocessor designers rely on multiple levels of cache to deal with this problem. However, each new level of cache is typically further away from the processing units and thus takes longer to access than the first-level cache. While these additional levels of cache help to speed up applications, they are not that effective when dealing with hot spots. Hot spots are typically small areas in the cache that are constantly being toggled between multiple sets of data. While additional levels of cache help to reduce the time needed for each lookup, they do not completely solve the problem.

Hence, what is needed is a method and an apparatus that reduces the effects of hot spots in cache without incurring the additional latency involved in retrieving data from lower levels in the memory hierarchy.

SUMMARY

One embodiment of the present invention provides a system that uses a hot spot cache to alleviate the performance problems caused by hot spots in cache memories, wherein the hot spot cache stores lines that are evicted from hot spots in the cache. Upon receiving a memory operation at the cache, the system performs a lookup for the memory operation in both the cache and the hot spot cache in parallel. If the memory operation is a read operation that causes a miss in the cache and a hit in the hot spot cache, the system reads a data line for the read operation from the hot spot cache, writes the data line to the cache, performs the read operation on the data line in the cache, and then evicts the data line from the hot spot cache.

In a variation on this embodiment, if the memory operation is a read operation that causes a miss in both the cache and the hot spot cache, the system retrieves a data line for the memory operation from a lower level of the memory hierarchy and writes the data line to the cache.

In a variation on this embodiment, if the memory operation is a write operation that causes a miss in the cache and a hit in the hot spot cache, the system reads a data line for the write operation from the hot spot cache, writes the data line to the cache, performs the write operation to the data line in the cache, and evicts the data line from the hot spot cache.

In a variation on this embodiment, if the memory operation evicts a data line from the cache, the system receives a signal from a hot spot predictor, which indicates if a set containing the data line being written to is a hot spot. If the set containing the cache line is a hot spot and a data line is being evicted from the set, the system writes the evicted data line to the hot spot cache so that the evicted data line can subsequently be retrieved from the hot spot cache without having to access a lower level of the memory hierarchy.

In a variation on this embodiment, the hot spot cache is a fully associative cache.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Hot Spot Cache

Figure 1:
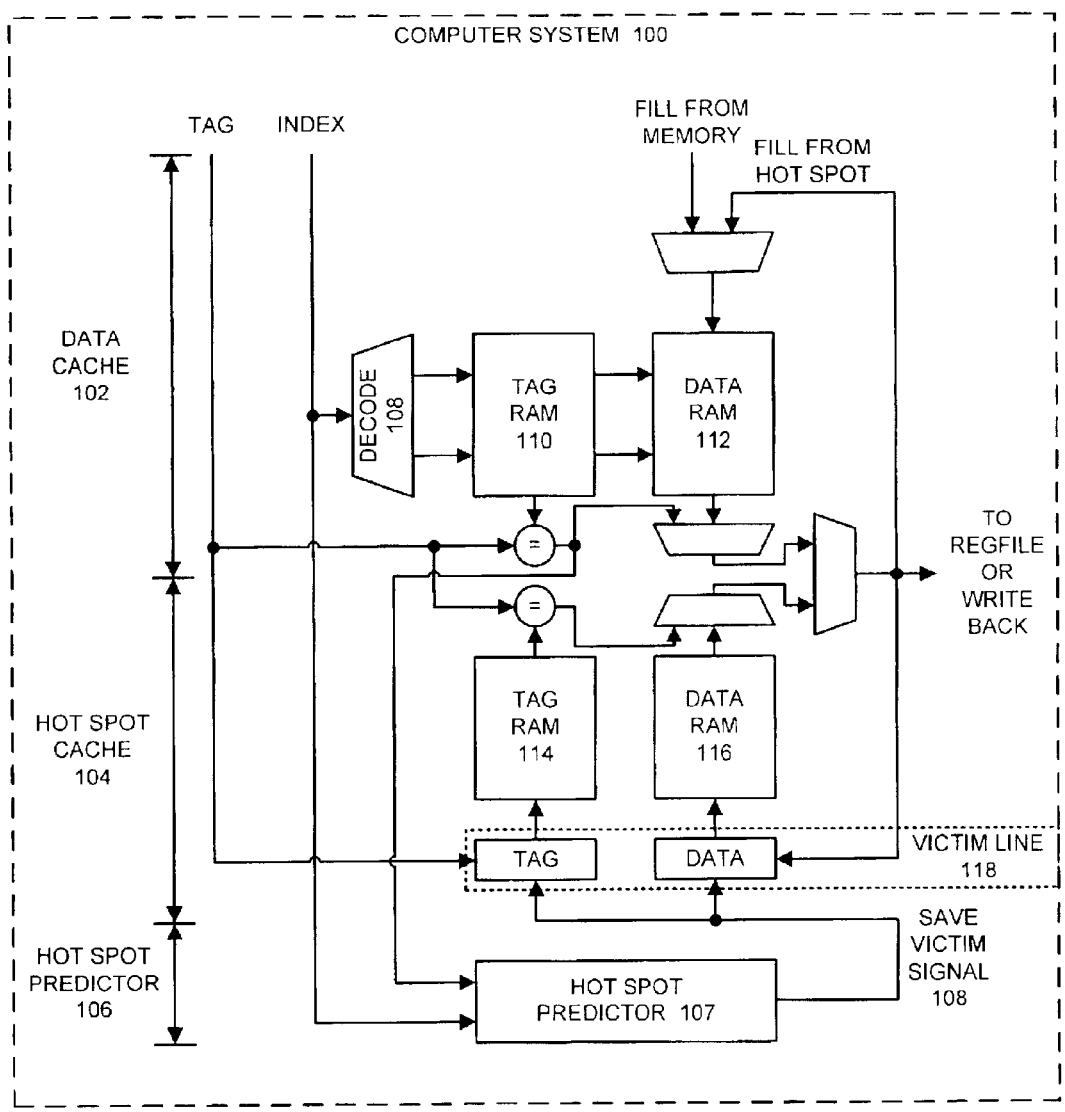
FIG. 1 illustrates a hot spot cache in accordance with an embodiment of the present invention.

FIG. 1 illustrates hot spot cache 104 in accordance with an embodiment of the present invention. FIG. 1 illustrates computer system 100. Computer system 100 can generally include any type of computer system, including, but not limited to, a computer system based on a microprocessor, a mainframe computer, a digital signal processor, a portable computing device, a personal organizer, a device controller, and a computational engine within an appliance.

Computer system 100 contains data cache 102, hot spot cache 104, and hot spot predictor 106. Note that data cache 102 can include any level of cache within computer system 100, such a level-one (L1) cache or a level-two (L2) cache. Data cache 102 can also include any type of cache, such an instruction cache or a data cache. Data cache 102 contains decode unit 108 which decodes memory addresses to select their corresponding locations in tag RAM 110 and data RAM 112. The output of tag RAM 110 is compared against the tag of the target address to determine if a data line for the target address is located within data cache 102. Note that if data cache 102 is a set associative cache, each lookup returns multiple tags that are compared in parallel against the tag for the target address. If the tag for the target address matches a tag retrieved from tag RAM 110, there is a cache hit. This means that the memory operation can be performed on the corresponding data line from data RAM 112.

Hot spot cache 104 stores cache lines that have been evicted from "hot spots" in data cache 102. Hot spot cache 104 contains tag RAM 114 and data RAM 116, which store tags and data for lines that have been evicted from hot spots in data cache 102. In this way, hot spot cache 104 effectively increases the associativity of data cache 102 for lines associated with hot spots by storing additional lines for the hot spots. Note that lines that are retrieved from hot spot cache 104 can be bypassed directly to the register file and can also be stored into data cache 102 for subsequent retrieval. In one embodiment of the present invention, hot spot cache 104 is a fully associative cache.

Hot spot predictor 107 determines whether or not a block in data belongs to a hot spot. If hot spot predictor 107 determines that a block in data cache 102 belongs to a hot spot, and if the block is being evicted from data cache 102, hot spot predictor 107 sends a save victim signal 108 to hot spot cache 104. This causes hot spot cache 104 to save the tag and data from victim line 118 in hot spot cache 104. Note that victim line 118 contains the tag and data being evicted from data cache 102.

Hot Spot Predictor

Figure 2:
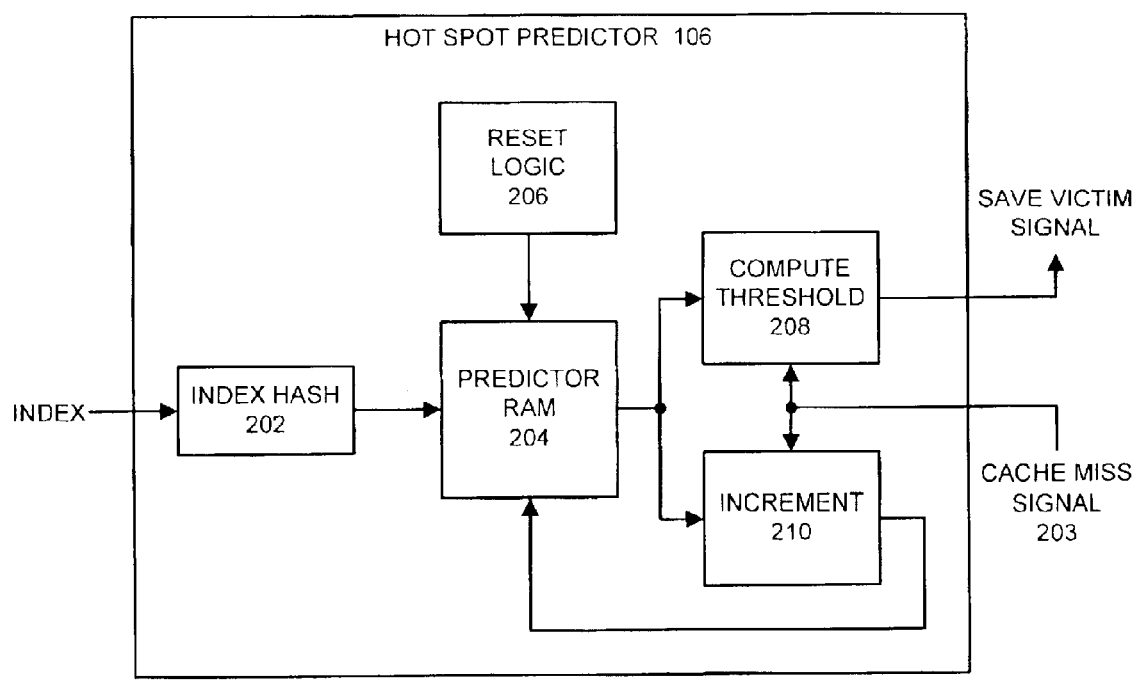
FIG. 2 illustrates a hot spot predictor in accordance with an embodiment of the present invention.

FIG. 2 illustrates hot spot predictor 106 in accordance with an embodiment of the present invention. Hot spot predictor 106 contains index hash unit 202, which performs a many-to-one mapping on the index portion of a target address for the current memory operation and uses the resulting modified index to perform a lookup into predictor RAM 204. In this way multiple entries in data cache 102 can map into a single location in predictor RAM 104. This saves on the amount of memory required to implement predictor RAM 204 at the cost of occasional aliasing problems.

Each entry in predictor RAM 204 contains a counter indicating how many times corresponding entries in data cache 102 have been written to. Upon receiving a modified index from index hash 202, predictor RAM 204 sends the count for the corresponding entries in data cache 102 to compute threshold unit 208 and increment unit 210. Increment unit 210 increments the count for the memory location and writes that count back to predictor RAM 204 if cache miss signal 203 is asserted. (Note that cache miss signal 203 is asserted if there is a miss in both data cache 102 can hot block cache 104). Compute threshold unit 208 determines if the count for the memory location is above a pre-determined threshold, and if so, determines that the cache line is "hot" and sends a save victim signal to hot spot cache 104 if cache miss signal 203 is asserted.

Hot spot predictor 106 also contains reset logic 206. Over time, the count for each memory location in predictor RAM 204 eventually becomes saturated. Hence, it is necessary to perform housekeeping on predictor RAM 204 to prevent it from sending a save victim signal for every memory operation in data cache 102. Reset logic 206 can send a signal to predictor RAM 204 every n cycles which instructs predictor RAM 204 to clear all counters. In one embodiment of the present invention, reset logic 206 is configured to clear predictor RAM 204 every 10,000 cycles.

Process of Implementing a Hot Spot Cache

Figure 3:
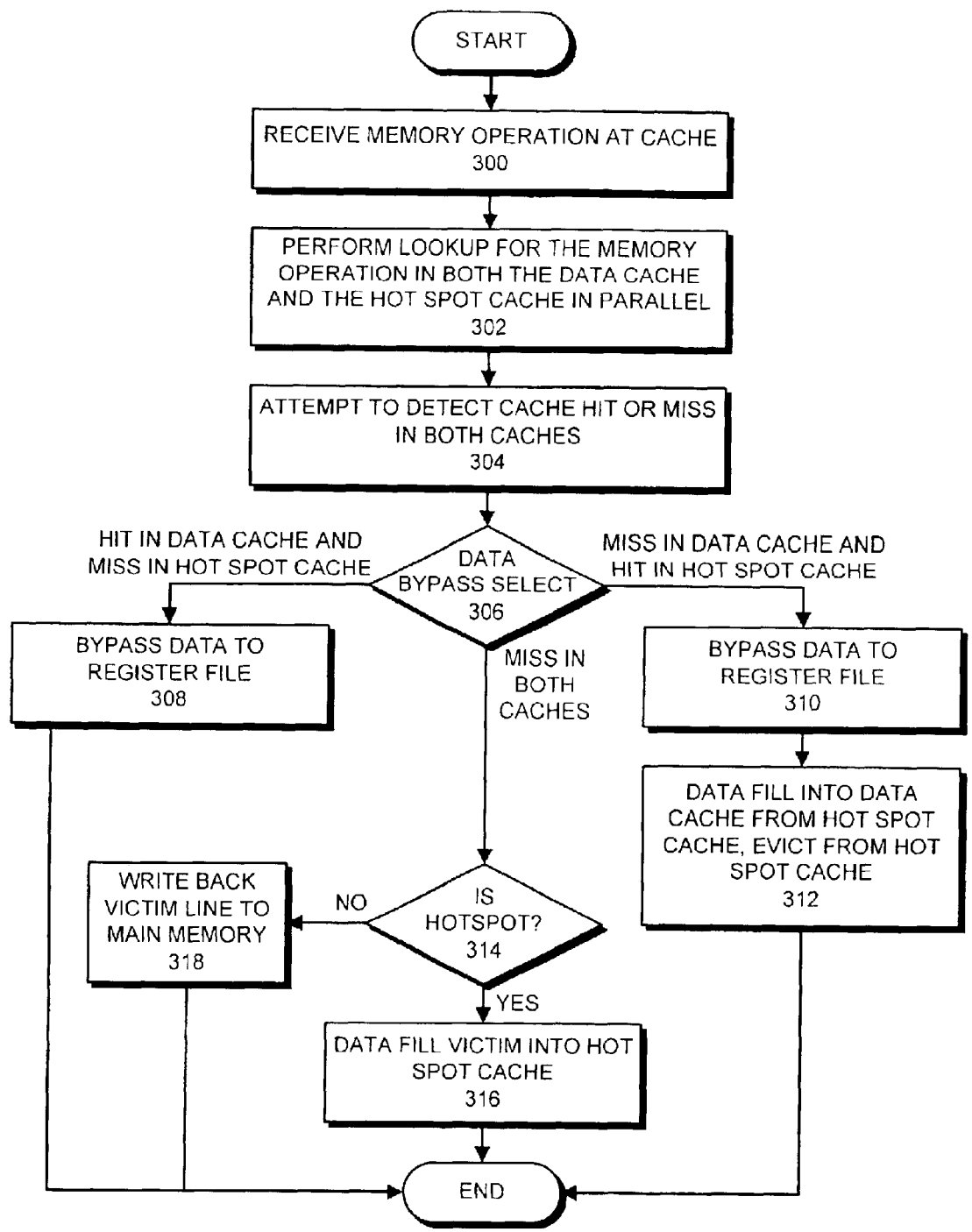
FIG. 3 presents a flow chart illustrating the operation of a hot spot cache in accordance with an embodiment of the present invention.

FIG. 3 presents a flow chart illustrating the operation of a hot spot cache 104 in accordance with an embodiment of the present invention. The system starts when a memory operation is received at data cache 102 (step 300). Upon receiving the memory operation, the system performs a lookup for the memory operation in data cache 102 and hot spot cache 104 in parallel (step 302). The system then determines if the memory operation produces a hit or a miss in each cache (step 304). Next, the system uses the hit or miss information to determine what actions to take (step 306).

If the memory operation results in a hit in data cache 102 and a miss in hot spot cache 104, the system bypasses the data from data cache 102 to the register file (step 308). If the memory operation results in a miss in data cache 102 and a hit in hot spot cache 104, the system bypasses the data from hot spot cache 104 to the register file (step 310). In this situation, the system also fills the data line from hot spot cache 104 into data cache 102, and also evicts the data line from hot spot cache 104 (step 312).

If the memory operation results in a miss in both data cache 102 and hot spot cache 104, the system tests to see if the entry in data cache 102 that corresponds to the memory operation is a hot spot (step 314), and if so, data fills the victim line from data cache 102 into hot spot cache 104 (step 316). Otherwise, if the memory operation is not directed to a hot spot in hot spot cache 104, the system writes back the victim line to main memory (step 318).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for using a hot spot cache to increase the hit rate of a cache, wherein the hot spot cache stores data lines that are evicted from hot spots in the cache, comprising:

receiving a memory operation at the cache; and performing a lookup for the memory operation in both the cache and the hot spot cache in parallel;

wherein if the memory operation is a read operation that causes a miss in the cache and a hit in the hot spot cache, the method further comprises, reading a data line for the read operation from the hot spot cache, writing the data line to the cache, performing the read operation on the data line in the cache, and evicting the data line from the hot spot cache.

2. The method of claim 1, wherein if the memory operation is a read operation that causes a miss in both the cache and the hot spot cache, the method further comprises:

retrieving a data line for the memory operation from a lower level of the memory hierarchy; and writing the data line to the cache.

3. The method of claim 1, wherein if the memory operation is a write operation that causes a miss in the cache and a hit in the hot spot cache, the method further comprises:

reading a data line for the write operation from the hot spot cache;

writing the data line to the cache;

performing the write operation to the data line in the cache; and evicting the data line from the hot spot cache.

4. The method of claim 1, wherein if the memory operation evicts a data line from the cache, the method further comprises:

receiving a signal from a hot spot predictor that indicates if a set containing the data line being written to is a hot spot; and if the set containing the cache line is a hot spot and a data line is being evicted from the set, writing the evicted data line to the hot spot cache so that the evicted data line can subsequently be retrieved from the hot spot cache without having to access a lower level of the memory hierarchy.

5. The method of claim 1, wherein the hot spot cache is a fully associative cache.

6. The method of claim 1, wherein the cache is an L1 or an L2 cache.

7. An apparatus for using a hot spot cache to increase the hit rate of a cache, wherein the hot spot cache stores data lines that are evicted from hot spots in the cache, comprising:

the cache;

the hot spot cache;

a receiving mechanism configured to receive a memory operation at the cache; and a memory operation processing mechanism configured to perform a lookup for the memory operation in both the cache and the hot spot cache in parallel;

wherein if the memory operation is a read operation that causes a miss in the cache and a hit in the hot spot cache, the memory operation processing mechanism is further configured to, read a data line for the read operation from the hot spot cache, write the data line to the cache, perform the read operation on the data line in the cache, and evict the data line from the hot spot cache.

8. The apparatus of claim 7, wherein if the memory operation is a read operation that causes a miss in both the cache and the hot spot cache, the memory operation processing mechanism is further configured to:

retrieve a data line for the memory operation from a lower level of the memory hierarchy; and write the data line to the cache.

9. The apparatus of claim 7, wherein if the memory operation is a write operation that causes a miss in the cache and a hit in the hot spot cache, the memory operation processing mechanism is further configured to:

read a data line for the write operation from the hot spot cache;

write the data line to the cache;

perform the write operation to the data line in the cache; and evict the data line from the hot spot cache.

10. The apparatus of claim 7, further comprising a signal mechanism configured to receive a signal from a hot spot predictor that indicates if a set containing the data line being written to is a hot spot; and wherein if the set containing the cache line is a hot spot and a data line is being evicted from the set, the memory operation processing mechanism is further configured to write the evicted data line to the hot spot cache so that the evicted data line can subsequently be retrieved from the hot spot cache without having to access a lower level of the memory hierarchy.

11. The apparatus of claim 7, wherein the hot spot cache is a fully associative cache.

12. The apparatus of claim 7, wherein the cache is an L1 or an L2 cache.

13. A computer system containing a hot spot cache that increases the hit rate of a cache, wherein the hot spot cache stores data lines that are evicted from hot spots in the cache, comprising:

the cache;

the hot spot cache;

a receiving mechanism configured to receive a memory operation at the cache; and a memory operation processing mechanism configured to perform a lookup for the memory operation in both the cache and the hot spot cache in parallel;

wherein if the memory operation is a read operation that causes a miss in the cache and a hit in the hot spot cache, the memory operation processing mechanism is further configured to, read a data line for the read operation from the hot spot cache, write the data line to the cache, perform the read operation on the data line in the cache, and evict the data line from the hot spot cache.

14. The computer system of claim 13, wherein if the memory operation is a read operation that causes a miss in both the cache and the hot spot cache, the memory operation processing mechanism is further configured to:

retrieve a data line for the memory operation from a lower level of the memory hierarchy; and write the data line to the cache.

15. The computer-system of claim 13, wherein if the memory operation is a write operation that causes a miss in the cache and a hit in the hot spot cache, the memory operation processing mechanism is further configured to:

read a data line for the write operation from the hot spot cache;

write the data line to the cache;

perform the write operation to the data line in the cache; and evict the data line from the hot spot cache.

16. The computer system of claim 13, further comprising a signal mechanism configured to receive a signal from a hot spot predictor that indicates if a set containing the data line being written to is a hot spot; and wherein if the set containing the cache line is a hot spot and a data line is being evicted from the set, the memory operation processing mechanism is further configured to write the evicted data line to the hot spot cache so that the evicted data line can subsequently be retrieved from the hot spot cache without having to access a lower level of the memory hierarchy.

17. The computer system of claim 13, wherein the hot spot cache is a fully associative cache.

18. The computer system of claim 13, wherein the cache is an L1 or an L2 cache.

19. A means for using a hot spot cache to increase the hit rate of a cache, wherein the hot spot cache stores data lines that are evicted from hot spots in the cache, comprising:

a receiving means for receiving a memory operation at the cache;

a lookup means for performing a lookup for the memory operation in both the cache and the hot spot cache in parallel; and a determination means for determining if the memory operation results in a miss in the cache and in the hot spot cache;

a memory operation processing means, wherein if the memory operation causes a miss in the cache and a hit in the hot spot cache, the memory operation processing means is configured to, read a data line for the read operation from the hot spot cache;

write the data line to the cache;

perform the read operation on the data line in the cache; and to evict the data line from the hot spot cache.

20. The means for using a hot spot cache to increase the hit rate of a cache of claim 19, wherein if the memory operation causes a miss in both the cache and the hot spot cache, the memory operation processing means is configured to:

retrieve a data line for the memory operation from a lower level of the memory hierarchy; and to write the data line to the cache.

\* \* \* \* \*